United States Patent
Matsumoto

(10) Patent No.: US 8,229,238 B2
(45) Date of Patent: Jul. 24, 2012

(54) IMAGE ENCODING APPARATUS, IMAGE PROCESSING APPARATUS AND CONTROL METHOD THEREOF

(75) Inventor: Yuki Matsumoto, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 841 days.

(21) Appl. No.: 12/366,409

(22) Filed: Feb. 5, 2009

(65) Prior Publication Data

US 2009/0208126 A1 Aug. 20, 2009

(30) Foreign Application Priority Data

Feb. 19, 2008 (JP) ................................ 2008-037947
Nov. 19, 2008 (JP) ................................ 2008-296041

(51) Int. Cl.
*G06K 9/46* (2006.01)
(52) U.S. Cl. ........ 382/244; 382/176; 382/168; 382/171; 382/243
(58) Field of Classification Search .................. 382/176, 382/168, 173, 171, 243, 233, 239.289, 244
See application file for complete search history.

(56) References Cited

U.S. PATENT DOCUMENTS

| | | | | |
|---|---|---|---|---|
| 5,848,185 A * | 12/1998 | Koga et al. | ..................... | 382/173 |
| 6,738,526 B1 * | 5/2004 | Betrisey et al. | ............... | 382/260 |
| 7,133,565 B2 | 11/2006 | Toda et al. | | |
| 7,386,168 B2 * | 6/2008 | Misawa | ......................... | 382/166 |
| 7,821,656 B2 * | 10/2010 | Ito et al. | .......................... | 358/1.1 |
| 2006/0061794 A1 * | 3/2006 | Ito et al. | ....................... | 358/1.13 |
| 2009/0046931 A1 * | 2/2009 | Xiao et al. | ...................... | 382/180 |
| 2009/0204475 A1 * | 8/2009 | Cohen et al. | ..................... | 705/10 |

FOREIGN PATENT DOCUMENTS

| | | |
|---|---|---|
| JP | 2002-077633 | 3/2002 |
| JP | 2004-350240 | 12/2004 |
| JP | 2006-140970 | 6/2006 |

* cited by examiner

*Primary Examiner* — Brian Q Le
*Assistant Examiner* — Mekonen Bekele
(74) *Attorney, Agent, or Firm* — Cowan, Liebowitz & Latman, P.C.

(57) ABSTRACT

The invention provides an image encoding apparatus which can improve image quality of an output image while further reduce the amount of attribute. A determination unit determines an area including a character/line drawing as a foreground image area based on an input multi-valued image. A foreground image generator generates foreground image in binary representation so that a first encoder performs MMR encoding on the foreground image. A background image generator generates multi-valued background image data by replacing the value of a multi-valued pixel in a position of the character/line drawing in the foreground image area with a replacement value calculated from the pixel values in a position of the non-character/line drawing pixel. A second encoder performs JPEG encoding on the background image. A mask unit masks attribute for pixels within the foreground image area with a predetermined value to output the masked data to a third encoder.

17 Claims, 9 Drawing Sheets

FIG. 3A

STRUCTURE OF FOREGROUND IMAGE ENCODED DATA

| (x,y) | w | h | CODED DATA |
|---|---|---|---|

{ CHARACTER AREA COORDINATES }

CHARACTER COLOR INFORMATION

| (x,y) | w | h | CODED DATA | ..... |
|---|---|---|---|---|

CHARACTER COLOR INFORMATION

FIG. 3B

STRUCTURE OF FOREGROUND IMAGE ENCODED DATA

| (x,y) | w | h | CODED DATA | MARKER | CODED DATA | MARKER | CODED DATA | ..... |
|---|---|---|---|---|---|---|---|---|

{ CHARACTER AREA COORDINATES }

CHARACTER COLOR INFORMATION

CHARACTER COLOR INFORMATION

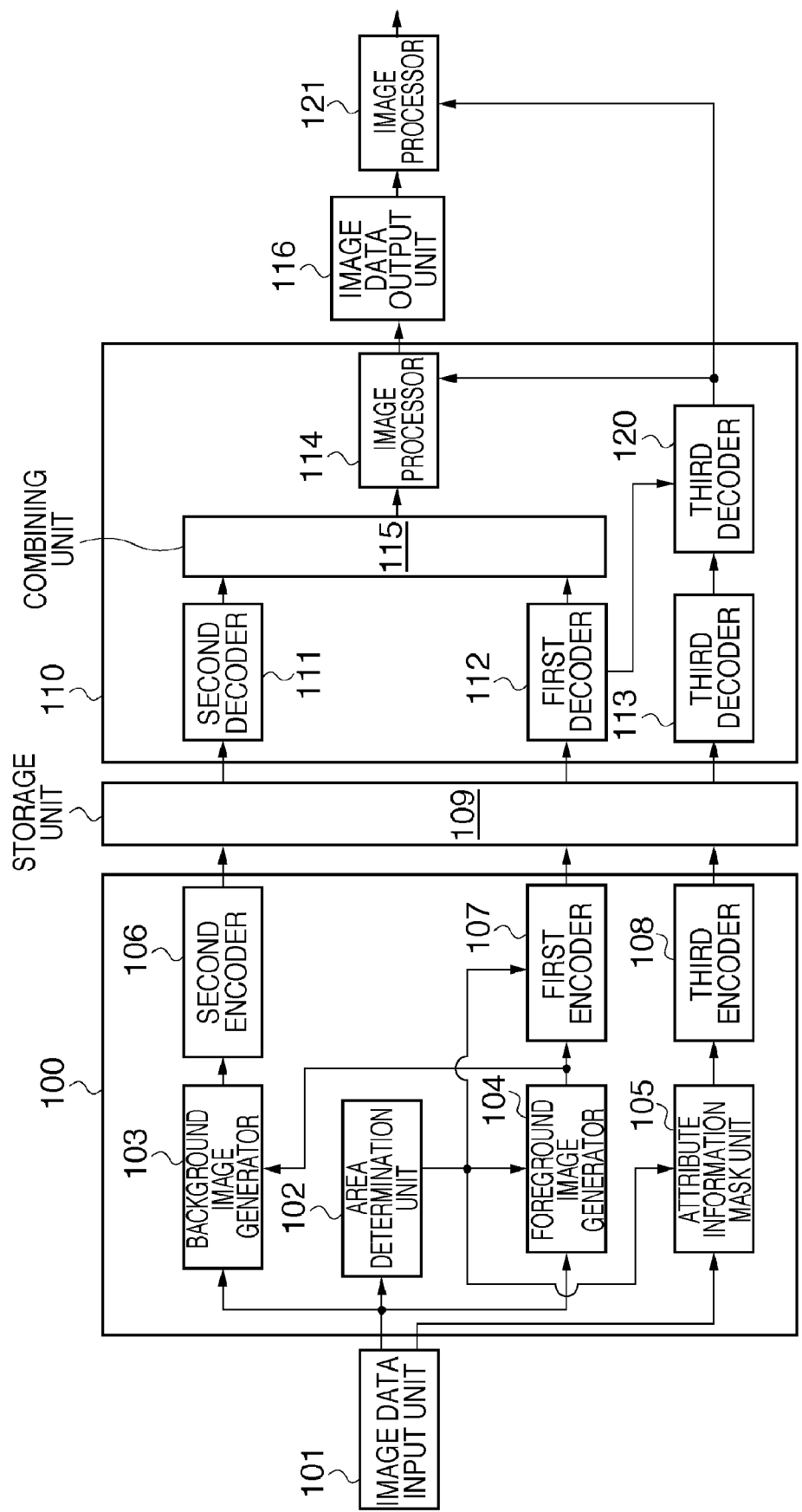

IMAGE ENCODING APPARATUS, IMAGE PROCESSING APPARATUS AND CONTROL METHOD THEREOF

BACKGROUND OF THE INVENTION

1. Field of the Invention

The present invention relates to a technique for encoding image data.

2. Description of the Related Art

Conventionally, a technique for performing area separation processing on an image obtained by scanning, generating attribute map information indicating character areas and photographic areas to which each pixel belongs, and setting an image processing parameter in correspondence with the attribute map information, is known (see Japanese Patent Application Laid-Open No. 2006-140970).

In this method, when a pixel is a character pixel, a "1" 1-bit signal is outputted, on the other hand, when the pixel is a photographic pixel, a "0" 1-bit signal is outputted. As a result, edge emphasis processing or the like is performed for character pixels to sharpen a character portion, while smoothing processing is performed for picture pixels. Thus an excellent output image, in which processings corresponding to respective attributes have been performed, can be obtained.

Further, to prevent image degradation in encoding of a mixed image including character and photographic image areas, for example, Japanese Patent Application Laid-Open No. 2002-077633 discloses first separating a character image area (hereinbelow, a "character area") and a photographic image area (hereinbelow, a "photographic area"), and performing binary lossless encoding processing such as MMR on the character area, while performing JEPG encoding on the other area than the character area, thereby suppressing image degradation in compression-encoding at a high compression rate.

However, in the above method, to perform appropriate image processing by image area, it is necessary to prepare attribute data by each pixel for several bits. This causes a problem in increase in the amount of attribute data. Further, when area separation is performed then encoding is performed, character processing such as edge emphasis is not performed on other areas than a character area. When erroneous determination has occurred, an output image with excellent image quality cannot be obtained.

SUMMARY OF THE INVENTION

The present invention provides an encoding technique for further improving the quality of an output image while further reducing the amount of attribute data.

To solve this problem, the present invention provides an image encoding apparatus for encoding image data, comprising: an input unit which inputs multi-valued image data to be encoded and attribute data of respective pixels constituting the multi-valued image data; a determination unit which determines an area including a character/line drawing in the multi-valued image data, as a foreground image area, based on the input multi-valued image data; a foreground image generation unit which generates foreground image data in binary representation, having character/line drawing pixels constituting the character/line drawing and non-character/line drawing pixels other than the character/line drawing pixels, from the multi-valued image data in the foreground image area determined by the determination unit; a first encoding unit which lossless-encodes the foreground image data generated by the foreground image generation unit; a background image generation unit which generates multi-valued background image data by replacing a value of a multi-valued pixel, in a position of the character/line drawing pixel in the multi-valued image data inputted by the input unit, with a replacement value calculated by referring to a value of a multi-valued pixel in a position of the non-character/line drawing pixel, based on the foreground image data generated by the foreground image generation unit; a second encoding unit which lossy-encodes the background image data generated by the background image generation unit by performing frequency transformation and quantization; a mask unit which masks attribute data for a pixel within the foreground image area obtained by the determination unit with a predetermined value, while maintaining attribute data for a pixel without the foreground image area; and a third encoding unit which lossless-encodes attribute data after masking processing by the mask unit.

According to the present invention, it is possible to further improve the quality of an output image while further reducing the amount of attribute data.

Further features of the present invention will become apparent from the following description of exemplary embodiments with reference to the attached drawings.

BRIEF DESCRIPTION OF THE DRAWINGS

FIGS. 3A and 3B are tables showing examples of data structure of encoded data of a foreground image area in the embodiment;

FIG. 8 is a block diagram of the multi-function apparatus according to a fourth embodiment of the present invention.

DESCRIPTION OF THE EMBODIMENTS

Hereinbelow, embodiments of the present invention will be described in detail with reference to the attached drawings.

First Embodiment

Figure 1:
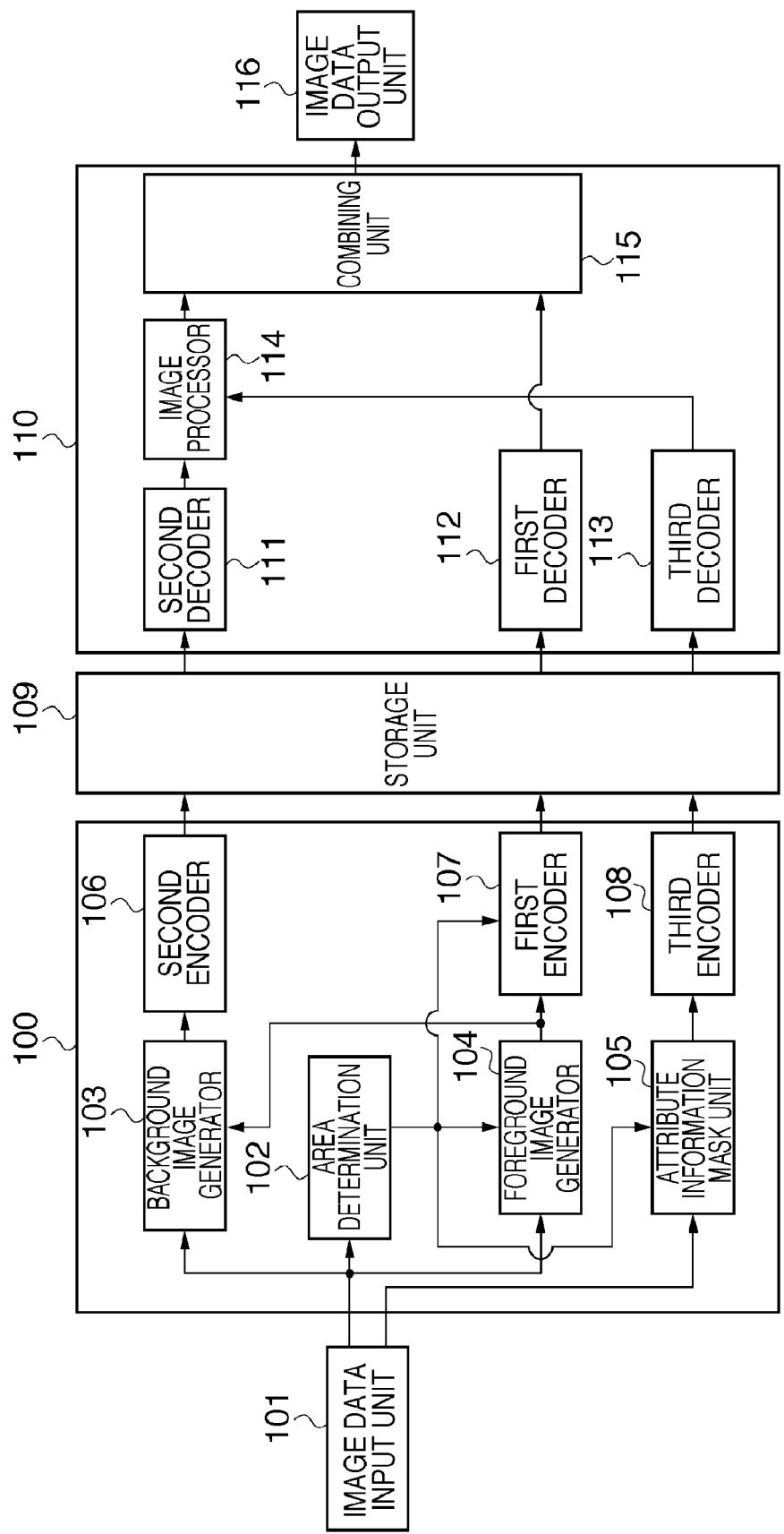
FIG. 1 is a block diagram of a multi-function apparatus according to a first embodiment of the present invention.

In the present embodiment, an example where the present invention is applied to a multi-function apparatus will be described. FIG. 1 is a block diagram of a multi-function apparatus according to the present embodiment. The apparatus has, briefly, an image data input unit 101, an input image processor 100 to perform encoding processing, a storage unit 109 such as a hard disk device, an output image processor 110 to perform decoding processing, and an image data output unit 116 represented by a printer engine controller. Note that the input image processor 100 corresponds to an image encoding apparatus of the present invention.

The general processing of the apparatus according to the present invention is as follows.

As long as image data to be print-outputted exists, the image data input unit 101 sequentially outputs respective image data and attribute data to be described later to the input image processor 100. The input image data processor 100 compression-encodes the input image data and attribute data, and sequentially stores the encoded data in the storage unit 109.

On the other hand, the output image processor 110 reads the image data and its attribute data stored in the storage unit 109 in accordance with a printing speed of the image data output unit 116, performs decoding processing, and outputs the decoded data to the image data output unit 116. That is, the storage unit 109 functions as a buffer positioned between the input image processor 100 and the output image processor 110. Accordingly, the image data input unit 101 and the input image data processor 100 can perform high speed processing independently of printing speed.

Hereinbelow, the respective processors in the present embodiment will be described in more detail.

The image data input unit 101 is connected to a scanner unit to read an original image, and a rendering unit to generate bitmap image data from print data received from a network (both units are not shown). The image data input unit 101 inputs color image data in which RGB of 1 pixel are represented with 8 bits, from one of the scanner unit and the rendering unit, performs attribute determination by pixel, and outputs the color image data and attribute data by pixel. Note that as the rendering unit analyzes print data and generates bitmap image data, the attributes of the respective pixels can be determined during rendering processing. Accordingly, it is apparent that when the rendering unit performs rendering, attribute determination can be easily performed.

Next, the attribute data will be described. The attribute data is a signal (hereinbelow, also referred to as "flag data") for performing optimum image processing in correspondence with the feature of an image included in an original image. For example, when an original image is read with an image scanner, generally the original image includes various image areas such as a continuous gray-level full-color photographic image area, a solid black character area, and a halftone print area like a newspaper print area. When one type of image processing is uniformly performed on these areas, an output image may not have desirable image quality. Accordingly, generally, upon print-output of color image data, edge emphasis processing, printing using only a single print color component, or the like, is performed regarding a pixel having a character/line drawing attribute. Further, smoothing processing is performed on image data having a non-character/line drawing attribute such as a natural image. Thus an image with excellent tonality can be formed.

Note that as a technique regarding determination of attribute by pixel, Japanese Patent Application Laid-Open No. 2004-350240 can be given. According to this publication, in sequential processing of image data in raster scanning order, filter transformation using a Laplacian filter is performed on a predetermined range of pixel group, e.g., 7×7 pixel area, in the neighborhood of a pixel of interest. After the transformation, when the value of the pixel of interest exceeds a predetermined value, it is determined that the pixel constitutes an edge. Upon character detection, as a character mainly has lines, a character area can be efficiently detected by using a filter corresponding to a relatively low frequency in a predetermined direction. When a predetermined number or more of pixels determined as a character edge are included in a predetermined area in the neighborhood of a pixel of interest, it is determined that the pixel of interest is a character area pixel. Further, in addition to the character attribute, various attribute data such as a halftone attribute and a figure attribute are generated in correspondence with image processing. In the present embodiment, the attribute generation is performed by using the above-described technique, however, other techniques may be employed.

As described above, the image data input unit 101 in the present embodiment outputs color image data and attribute data by pixel to the input image processor 100. In the present embodiment, attribute data "1" indicates that the subject pixel is a character/line drawing pixel, and attribute data "0", a non-character/line drawing pixel (a pixel of a background image such as a natural image) other than the character/line drawing pixel. As the attribute data is "0" or "1", attribute data for 1 pixel is 1-bit data. Note that as an attribute by pixel, multiple bit data including identification bits such as a chromatic/achromatic color identification bit and an identification bit indicating reading from an original image or rendering based on print data. In the present embodiment, for the sake of simplification of explanation, the attribute data is 1-bit data indicating a character/line drawing image or non-character/line drawing image such as a natural image, per 1 pixel, as described above.

Figure 2A:
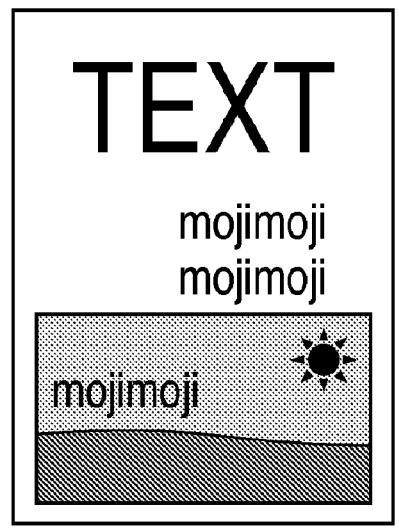
FIGS. 2A to 2C illustrate examples of image data to be processed, attribute data and foreground image areas.
Figure 2B:

Accordingly, in image data (multi-valued color image data) shown in FIG. 2A, attribute data are visually represented as shown in FIG. 2B. In the figure, a black portion indicates attribute "0", and a white portion, attribute "1".

Note that as described above, in the present embodiment, the attribute data by pixel is information indicating a character area or a non-character area, however, the attribute data may be information indicating a character edge or a non-character edge.

Next, the input image processor 100 in the present embodiment will be described. The input image processor 100 functions as a processor to efficiently encode image data and attribute data from the image data input unit 101.

As described above, the input image processor 100 inputs color image data and attribute data by pixel from the image data input unit 101. The order of input of color image data is the order of raster scanning. Further, the respective R, G and B color components (each 8 bits=256 gray levels) of each pixel are inputted in this order. The R, G and B components are defined as component numbers 0, 1 and 2. Further, on the assumption that the coordinates of an upper left corner of the image are (0, 0), the value of the component number C of a pixel positioned in a horizontal rightward pixel position x and a vertical downward pixel position y is expressed as P(x, y, C). For example, when a pixel in a position (x, y)=(3, 4) has a value (R, G, B)=(255, 128, 0), P(3, 4, 0)=255, P(3, 4, 1)=128, and P(3, 4, 2)=0 hold.

The area determination unit 102 scans image data inputted from the image data input unit 101, and determines whether a pixel of interest is included in a character/line drawing area (hereinbelow, also referred to as a "foreground image area") or a non-character/line drawing area (hereinbelow, referred to as "foreground/background determination"). As it will be apparent from the following description, this determination is performed so as to improve the efficiency in encoding of image data and attribute data.

The foreground/background determination, i.e., image separation may be performed by e.g. Japanese Patent Application Laid-Open No. 2002-077633 as follows.

From RGB image data, the following operation is performed, to calculate a luminance value Y.

$$Y = 0.299R + 0.587G + 0.114B \quad (1)$$

Then the image data having the obtained luminance Y is binarized using a predetermined threshold value T, and image data in binary representation is generated. Next, profile line tracking is performed on pixels with low luminance (high density) in the binarized data, and affix a label to a group of low luminance pixels. This processing is repeated, and as a result, plural labeled pixel groups are generated. Then, an area including a character/line drawing is determined from the shapes of labeled pixel groups and the distances between the groups. Among the determined character/line drawing areas, when similar areas exist within a predetermined distance, they are defined as 1 group. The area of a group circumscribed with a rectangle is a foreground image area.

Figure 2C:
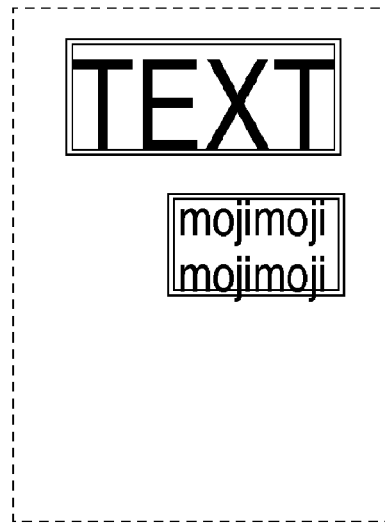

As a result of the above processing, in the image in FIG. 2A, two double-line rectangular areas in FIG. 2C are extracted as foreground image areas.

The area determination unit 102 generates information indicating a foreground image area (the coordinates of the upper-left corner and the lower right corner of the rectangular area, or the coordinates of the upper-left corner or the lower right corner of the rectangular area and height and width of the rectangular area) as described above, and outputs the information to a foreground image generator 104, an attribute information mask unit 105, and a first encoder 107.

Figure 4A:
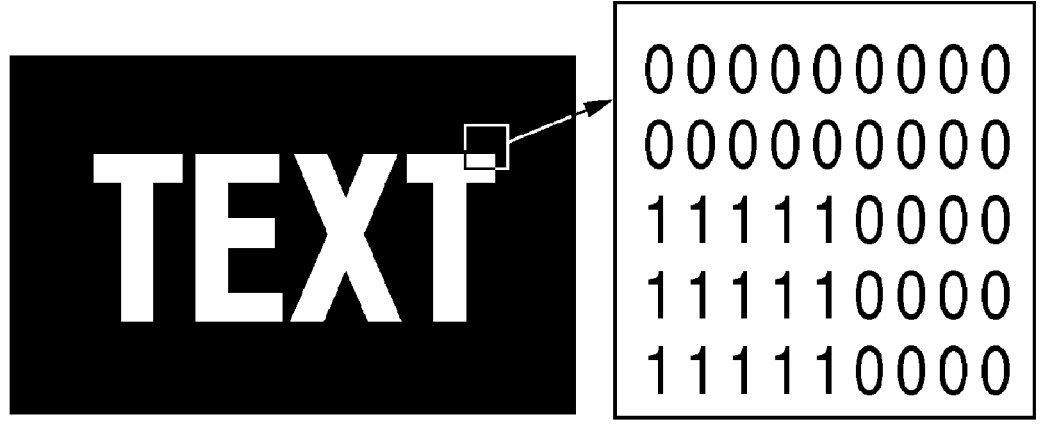
FIGS. 4A and 4B illustrate examples of a character image generated by a foreground image generator.

The foreground image generator 104 generates a character/line drawing image (hereinbelow, simply referred to as a "character image") in the foreground image area based on the foreground image area information inputted from the area determination unit 102. More particularly, the foreground image generator 104 binarizes the luminance values of the respective pixels in multi-valued image data positioned in the area indicated with the foreground image area information using a predetermined threshold value. Then the foreground image generator 104 outputs the binarized image, as a character image, to a background image generator 103 and the first encoder 107. Note that in the present embodiment, in the result of binarization, a pixel having a luminance value equal to or lower than the threshold value is "1", and other pixel than the "1" pixel, "0". In other words, a pixel constituting a character (a black pixel in the case of a general document) is "1", while other pixel than the character pixel, "0". FIG. 4A shows an example of the character image generated by the foreground image generator 104 and correspondence between the image and respective pixel values.

Figure 4B:
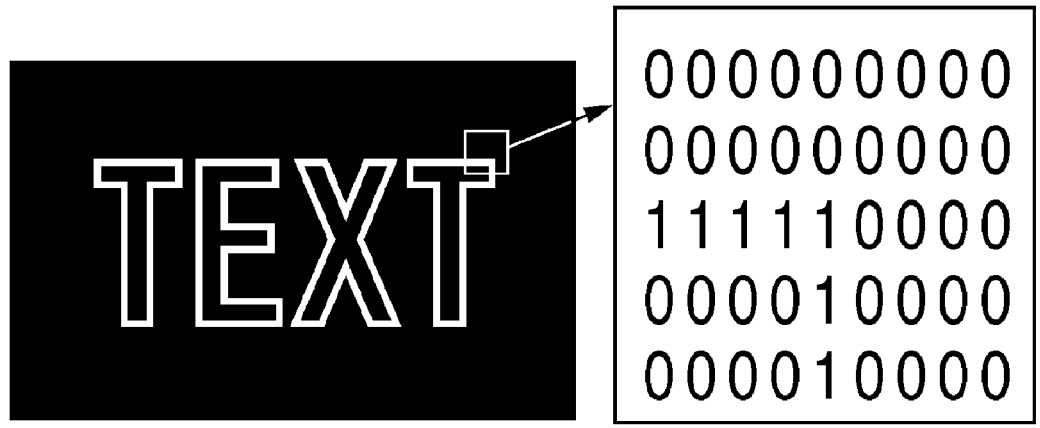

Note that the foreground image generator 104 may generate binary data indicating whether or not a pixel is a character/line drawing edge, as a character image. FIG. 4B shows an example of the character image in this case and correspondence between the image and respective pixel values.

Further, the foreground image generator 104 obtains the colors of the "1" pixels in the generated character image, and calculates a representative color of the character in the foreground image area. More particularly, the foreground image generator 104 first performs thinning on the character portion in the generated character image, to generate a thinned binary image. Then, the foreground image generator 104 calculates an average of the respective color components on the multi-valued image data corresponding to the "1" pixels on the thinned binary image, determines the obtained average of the respective components as the color of the character image, and outputs the character color (respectively 8-bit RGB data) to the first encoder 107. When an original is read with a scanner, a character edge portion often includes a mixture of colors of the background and the character, therefore, thinning is performed to remove such color. In other words, as a result of thinning, as the color corresponding to the "1" pixel value is a color inner than the edge of the character/line image, the initial color of the character can be detected with high precision.

The background image generator 103 performs filling of a background image based on the image data (multi-valued color image) from the image data input unit 101 and the character image (binary image) from the foreground image generator 104. The filling processing is performed as follows.

For the sake of simplification of explanation, a pixel value as a result of binarization in a coordinates (x, y) in the character image is B(x, y), and a pixel value in the multi-valued image is P(x, y, C) as described above. Accordingly, a pixel, regarding which B(x, y)=1 holds, always exists within the character image area.

First, respective pixels of the multi-valued image data in all the pixel positions in which B(x, y)=0 holds are referred to, and an average is calculated. In the present embodiment, as a color is defined with R, G and B components, the color indicated with the average by each component is an average color. Next, within the character image area, the pixel values regarding which B(x, y)=1 holds in the multi-valued image data are replaced with the calculated average color. That is, pixels determined as a character/line drawing in the multi-valued image are replaced with the average color. In other words, the average color can be referred to as a "replacement value" (or "replacement color").

As a result of the above processing, the background image generator 103 generates new multi-valued image data in which the respective pixels constituting the character/line drawing in the input multi-valued image are replaced with the background color, as background image data. The background image generator 103 outputs the generated background image data to a second encoder 106. As it is easily understood by persons skilled in the art, the background image generator 103 generates an image in which high frequency components of the input multi-valued image are eliminated or reduced.

The attribute information mask unit 105 performs masking processing on the attribute information by pixel, inputted from the image data input unit 101, in accordance with the character image area information from the area determination unit 102, and outputs the result of masking processing to a third encoder 108. More particularly, the attribute information mask unit 105 masks the attribute information within the area indicated with the character image area information (coordinate information) from the area determination unit 102 with "0" and outputs the information. Further, the attribute information mask unit 105 maintains the attribute information without the character image area (without the foreground image area) and outputs the information without any change of such attribute information.

The first encoder 107 stores the character image data (binarized image data) in the foreground image area from the foreground image generator 104 into a buffer memory (not shown), and performs lossless encoding such as MMR. Then the first encoder 107 outputs the information on the character color from the foreground image generator 104, the foreground image area information (coordinate information of the character image area) from the area determination unit 102, and the generated encoded data, in a predetermined format, to the storage unit 109. Note that as long as a binary image is lossless-encoded, the encoding is not limited to MMR.

FIGS. 3A and 3B show examples of the data structure of the encoded data generated by the first encoder 107. One image may include no foreground image area, or may include plural foreground image areas. FIG. 3A shows a data structure in which a set of coordinates of an upper-left corner of a foreground image area (character image), a width, a height (respectively the number of pixels), character color information (RGB 24 bits in the present embodiment), and encoded character image data, continues in correspondence with the number of foreground image areas. In the present embodiment, the first encoder 107 generates encoded data having the data structure in FIG. 3A. However, it may be arranged such that the first encoder 107 generates encoded data having the data structure in FIG. 3B. In the example of FIG. 3B, first, a set of coordinates of an upper-left corner of a foreground image, a width, a height and character color information, continues in correspondence with the number of foreground image areas, and following the data sets, encoded data continues with markers therebetween.

The second encoder 108 stores the multi-valued color image data after removal of high frequency components from the background image generator 103 into a buffer memory (not shown), and performs lossy encoding. In the lossy encoding, an encoder in conformity with or based on JEPG (ITUT-T. 81|ISO/IEC IS 10918) or the like recommended as international standards for multi-valued natural images may be used. As the details of JPEG encoding are published in the written standards, the explanation thereof will be omitted here. The encoded data generated by the second encoder 108 is stored in the storage unit 109.

Further, the third encoder 108 stores the attribute information (1 bit per 1 pixel in the present embodiment) masking-processed by the attribute information mask unit 105 into the buffer memory (not shown), and performs lossless encoding. In the present embodiment, run-length encoding is used as the lossless encoding, however, as long as lossless encoding is performed, the encoding by the third encoder 108 is not limited to the run-length encoding. The encoded attribute information is stored into the storage unit 109. As described above, attribute information within a foreground image area is masked to at least "0". Accordingly, as the "0" value continues as the attribute information within the foreground image area, a high coding efficiency can be obtained.

As described above, the storage unit 109 holds background image encoded data, foreground image encoded data and attribute encoded data for one image data. Note that these three encoded data may be stored in one file.

The input image processor 100 performs the above processing upon input of image data and attribute information from the image data input unit 101.

Next, the output image processor 110 to decode encoded data stored in the storage unit 109 will be described.

As shown in FIG. 1, the output image processor 110 has a first decoder 112, a second decoder 111, a third decoder 113, an image processor 114 and a combining unit 115.

The first decoder 112 decodes character image data stored in the storage unit 109, and stores the result of decoding (binary image data in a foreground image area), a character color and background image area information into its internal buffer memory. Further, at this time, the first decoder 112 performs RGB-to-YMCK conversion on the character color information and stores the converted information. The RGB-to-YMCK conversion is performed not by pixel but by foreground image area. Accordingly, the load on the first decoder 112 is low. However, it may be arranged such that a processor for the RGB-to-YMCK conversion is provided in addition to the first decoder 112. The first decoder 112, which corresponds to the above-described first encoder 107, performs MMR decoding processing for decoding of the binary image data.

The second decoder 111 decodes encoded background image data stored in the storage unit 109 and stores the decoded data into its internal buffer memory. The second decoder 111, which corresponds to the above-described second encoder 106, performs JPEG decoding.

The third decoder 113 decodes encoded attribute information stored in the storage unit 109 and stores the decoded information into its internal buffer memory. The third decoder 113, which corresponds to the above-described third encoder 108, performs run-length decoding.

The image processor 114 raster-scans the buffer memory in the second decoder 111 and the buffer memory in the third decoder 113, and reads data of each pixel (RGB data) and attribute information. The image processor 114 performs RGB-to-YMCK conversion processing and image processing for character/line drawing or non-character/line drawing (natural image) in accordance with attribute information, on YMCK-converted pixel data, by pixel, and outputs the processed image data to the combining unit 115. For example, when the attribute information of a pixel of interest is "1" indicating a character/line drawing, the image processor 114 performs edge emphasis filter processing, while when the attribute information is "0" indicating a non-character/line drawing (natural image), performs smoothing filter processing. As a result, the edge of a character/line drawing is sharpened. On the other hand, in a non-character/line drawing represented by a natural image, variation in density values is smoothed and an image with excellent tonally can be obtained. Note that as described above, as the attribute data within a foreground image area is "0", all the pixels in a foreground image area in a background image are subjected to smoothing processing.

The combining unit 115 reads the binary image data in the foreground image area, the character color information (data on YMCK print components) and the foreground image area information stored in the buffer memory in the first decoder 112. Then, the combining unit 115 sets the read character color information and the foreground image area information in its internal register. Then, the combining unit 115 counts pixel data inputted from the image processor 114, thereby determines whether or not the coordinates of each pixel data are within the foreground image area. When pixel data inputted from the image processor 114 is not in any foreground image area, the combining unit 115 outputs the pixel data without any processing to the image data output unit 116.

On the other hand, when it is determined that the pixel data inputted from the image processor 114 is positioned within some foreground image area, the combining unit 115 performs the following processing.

When the binary data corresponding to the pixel data read from the image processor 114 is "0":
(1) to output the pixel data read from the image processor 114 without any processing to the image output unit 116.

When the binary data corresponding to the pixel data read from the image processor 114 is "1":
(2) to output the respective component values of the character color information in the corresponding foreground image area to the image data output unit 116.

As described above, according to the first embodiment, within an area determined by the area determination unit 102 as a foreground image area, as all the attribute information indicating character/line drawing or non-character/line drawing are masked to a value indicating the non-character/line drawing, the efficiency in encoding of attribute information can be increased.

Modification of First Embodiment

The same processing as that in the above-described first embodiment may be realized with a computer program. Hereinbelow, the case where the processing is realized with software will be described.

Figure 7:
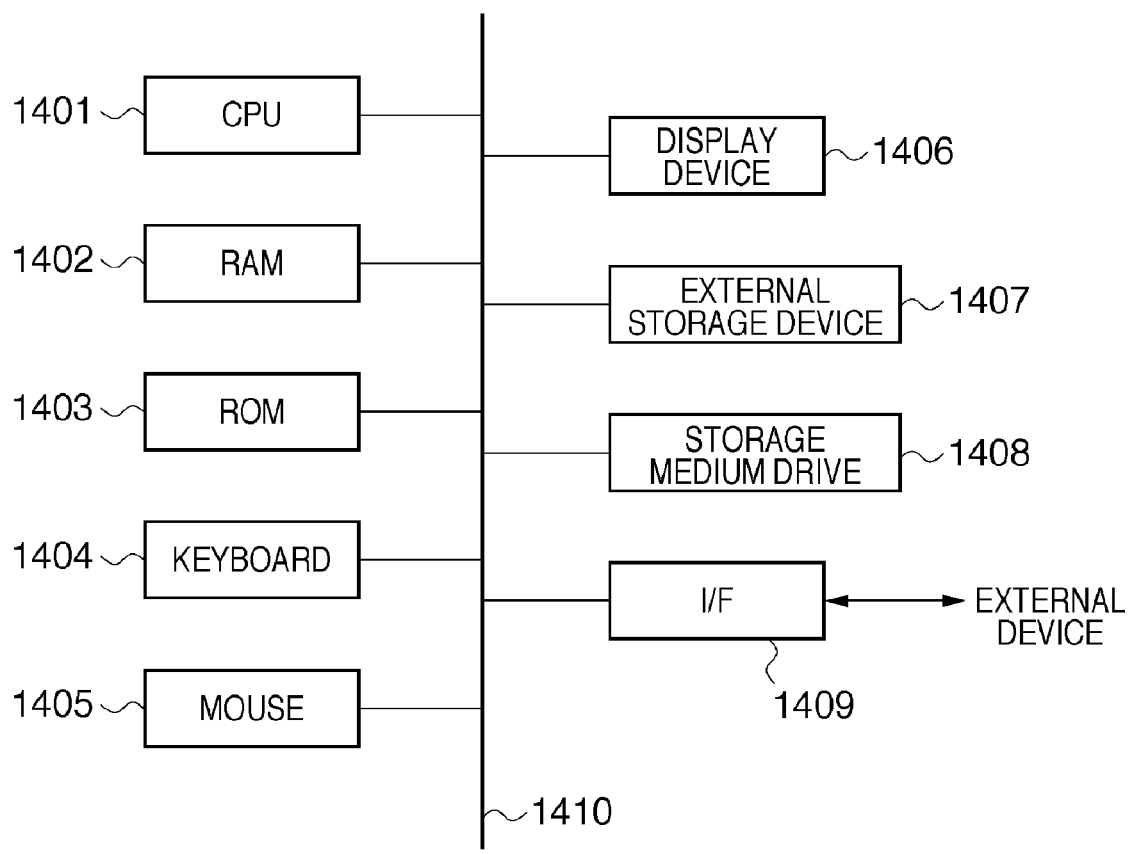
FIG. 7 is a block diagram showing an apparatus configuration when processing of image encoding according to the first to fourth embodiments is realized with a computer program.

FIG. 7 is a block diagram showing the basic configuration of an apparatus (PC or the like) when the processing is realized with software.

In FIG. 7, reference numeral 1401 denotes a CPU which controls the entire apparatus using a program and data stored in a RAM 1402 and/or a ROM 1403, and performs image encoding processing and decoding processing to be described later.

The RAM 1402 holds programs and data from an external storage device 1407 or a storage medium drive 1408, or downloaded from an external device via an I/F 1409. Further, the RAM 1402 is used as a work area for execution of various processings by the CPU 1401.

The ROM 1403 holds a boot program, setting program of the present apparatus and data.

Numerals 1404 and 1405 denote a keyboard and a mouse as one of pointing devices, to input various instructions to the CPU 1401.

Numeral 1406 denotes a display device, having a CRT or a liquid crystal display, which displays image and character information.

The external storage device 1407 is a large capacity information storage device such as a hard disk drive which holds an OS, a program for the image encoding and decoding processings to be described later, image data to be encoded, encoded data to be decoded and the like.

The storage medium drive 1408 reads a program and data stored in a storage medium such as a CD-ROM or a DVD-ROM and outputs them to the RAM 1402 and the external storage device 1407. Note that the program for the image encoding and decoding processings to be described later, image data to be encoded, encoded image data to be decoded and the like may be stored in the storage medium. In this case, the storage medium drive 1408 loads the program and data to a predetermined area on the RAM 1402 under the control of the CPU 1401.

The I/F 1409 connects an external device to the present apparatus and enables data communication between the apparatus and the external device. For example, image data to be encoded, encoded image data to be decoded or the like can be inputted into the RAM 1402 of the present apparatus or the external storage device 1407, or to the storage medium drive 1408. Numeral 1410 denotes a bus connecting the above-described respective components.

In the above configuration, when the same processing as that of the first embodiment is realized with software, the various processors in FIG. 1 are realized with functions, subroutines and the like on the software. Further, the internal buffers in the respective processors are ensured in the RAM 1402, and as the storage unit 109 for storage of encoded data, requiring a large capacity, the external storage device 1407 may be utilized. Note that as the image data output unit 116 in FIG. 1, a printer driver to perform output processing to an externally-connected printer or the like may be used.

Second Embodiment

In the above-described first embodiment, the background image generator 103 generates a new background image by replacing pixel values of multi-valued image data corresponding to "1" pixels of a character image generated by the foreground image generator 104 with a value of a replacement color.

Generally, when an original having only characters is read as a multi-valued image with an image scanner, regarding a character edge as a boundary, an area outside the edge is not always white and an area within the edge is not always complete black. That is, in the neighborhood of an edge boundary, the luminance (or density) varies at a certain grade. Accordingly, even when multi-value pixel data in a pixel position determined as a character/line drawing is replaced with a replacement color, in a non-replacement pixel area adjacent to the replaced pixel, the density may be greatly changed due to the influence of an initial character color. In other words, there is a high possibility that in the background image generated by the background image generator 103 in the first embodiment, high frequency components influenced by an initially-existed character/line drawing remain.

As the second encoder 106 in the present embodiment performs JPEG encoding, the second encoder 106 performs DCT transformation (frequency transformation), quantization and entropy encoding. Accordingly, when high frequency components remain in an image generated by the background image generator 103, alternating components obtained by the DCT transformation cannot become "0". As a result, the efficiency of encoding cannot be increased.

Accordingly, in the second embodiment, a solution of the above-described problem will be described.

Figure 5:
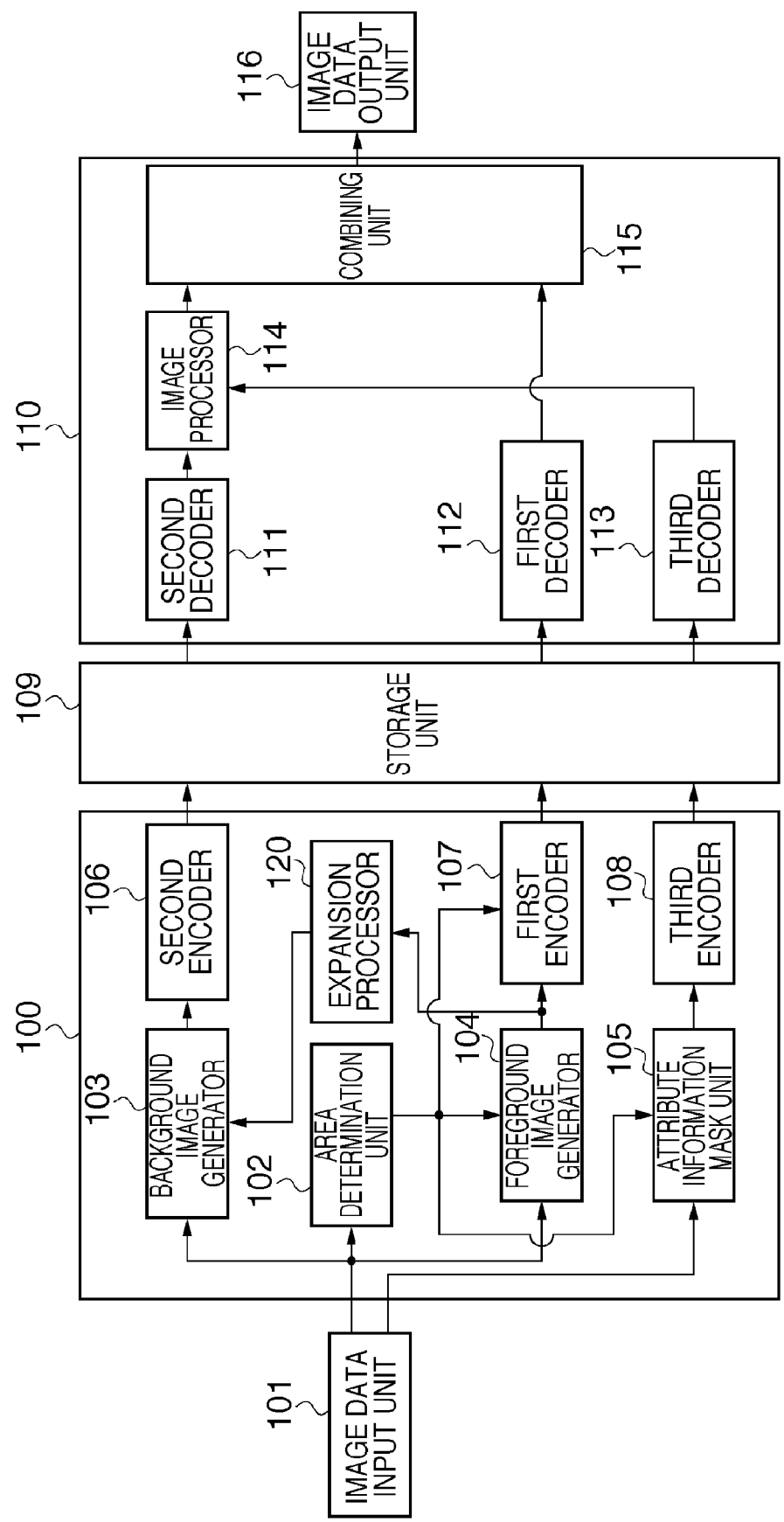
FIG. 5 is a block diagram of the multi-function apparatus according to a second embodiment of the present invention.

FIG. 5 is a block diagram of the multi-function apparatus according to the second embodiment. The difference from FIG. 1 is that an expansion processor 120 is provided between the foreground image generator 104 and the background image generator 103. As the other constituent elements are the same as those in the first embodiment, the explanations of those elements will be omitted.

The expansion processor 120 performs expansion processing (thickening processing) on a "1" area of character image data binarized from a foreground image area generated by the foreground image generator 104. For example, when image data is expanded (thickened) by only 1 pixel, the following processing is performed.

First, raster scanning is performed within the character image data using a 3×3 pixel size window. When even one "1" pixel exists in the window, the pixel value of a central position in the window is replaced with "1". In this manner, a "0" pixel value adjacent to the "1" pixel is replaced with "1", and the character/line drawing is thickened by 1 pixel. Accordingly, when the character image data is expanded by 2 pixels, the window size is 5×5 pixels. The window size may be determined depending on the reading resolution of the image scanner.

As a result of the above processing, the expansion processor 120 generates a binary image where a pixel of a character/line drawing, and in addition, a pixel of non-character/line drawing adjacent to the pixel of the character/line drawing have the value "1".

Accordingly, the background image generator 103 performs filling processing on the pixels of the character/line drawing, and in addition, the pixels of the non-character/line drawing in the neighborhood of the edge of the character/line drawing. As a result, the background image generator 103 in the second embodiment can generate a background image where high frequency components are further eliminated, in comparison with the first embodiment. This further increases the compressibility by the second encoder 106.

Note that as shown in FIG. 5, the first encoder 107 does not encode character image data expanded by the expansion processor 120. When the first encoder 107 encodes the result of processing by the expansion processor 120, a character/line drawing in the generated encoded data is thicker than that in the original image, and further, a small character may become blur and illegible.

As described above, according to the second embodiment, the efficiency in encoding of a background image can be increased in comparison with the first embodiment.

Note that as described in the modification of the first embodiment, it is apparent that the processing according to the second embodiment can be realized with a computer program.

Third Embodiment

Figure 6:
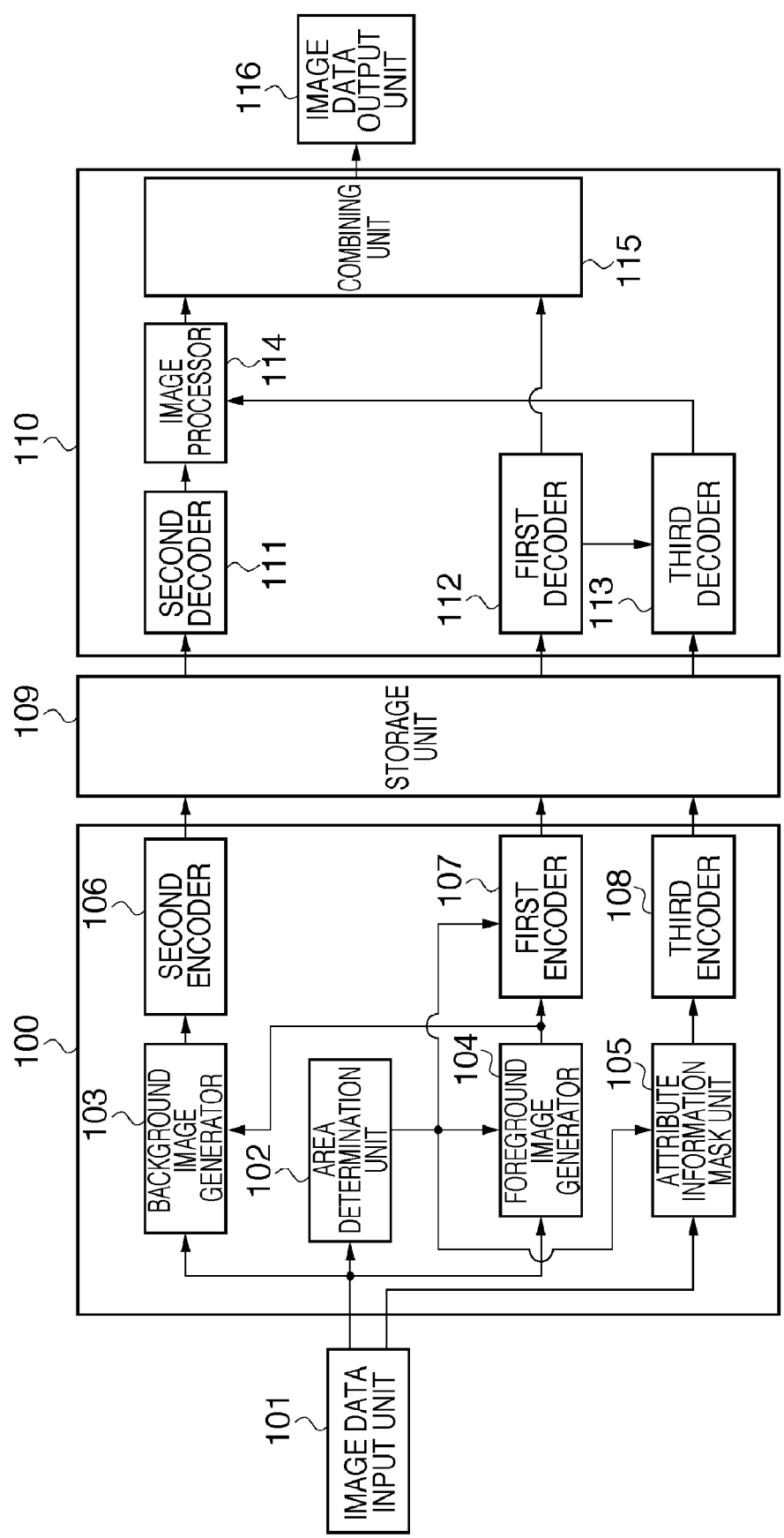
FIG. 6 is a block diagram of the multi-function apparatus according to a third embodiment of the present invention.

FIG. 6 is a block diagram of the multi-function apparatus according to a third embodiment. The difference from FIG. 1 is that the output from the first decoder 112 in the output image processor 110 is supplied to the third decoder 113. As the constituent elements are the same as those in the first embodiment except the output from the first decoder 112, the explanations of those elements will be omitted.

In the third embodiment, when character image data obtained by decoding by the first decoder 112 (binary image data) is "1", the third decoder 113 outputs the result of decoding of the attribute data, even if it is "0" (a pixel constituting a character/line drawing), as "1", to the image processor 114. On the other hand, when the character image data obtained by decoding by the first decoder 112 (binary image data) is "0" (a pixel of a non-character/line drawing), the third decoder 113 outputs the attribute data obtained by decoding to the image processor 114.

In this processing, regarding a character/line drawing, edge emphasis processing is performed even within a foreground image area, and the outline of a printed character/line drawing can be clarified.

Note that as described in the modification of the first embodiment, it is apparent that the processing according to the third embodiment can be realized with a computer program.

Fourth Embodiment

In the above first to third embodiments, the image processor 114 on the side of the output image processor 110 performs image processing on data obtained by the first decoder 112, the second decoder 111 or the third decoder 113, as an input.

That is, in the above-described respective embodiments, to increase the compressibility regarding attribute data within a foreground image area including a character/line drawing, all the attribute data within the foreground image area are set to "0".

In some cases, when the image data output unit 116 has outputted image data, attribute information for the entire image is required. For example, image processing such as halftone processing is performed on the entire image obtained after decoding, in addition to the above-described masked attribute information, all the attribute information for the entire image (1 screen) is required.

In the fourth embodiment, attribute information for 1 screen before masking is restored.

In the fourth embodiment, a foreground image outputted from the first decoder 111 and attribute information outputted from the third decoder 113 are merged, thereby attribute information before masking processing is restored.

For this purpose, the multi-function apparatus according to the fourth embodiment has a configuration as shown in the block diagram of FIG. 8. In FIG. 8, the difference from FIG. 1 is that an attribute information restoration unit 120 is provided downstream of the first decoder 112 and the third decoder 113. Further, the image processor 114 is provided between the combining unit 115 and the image data output unit 116. Further, an image processor 121 is added downstream of the image data output unit 116. As the configuration is basically the same as that in the first embodiment except the above differences, detailed explanation of the configuration will be omitted.

The attribute information restoration unit 120 inputs foreground image data (binary image data) outputted from the first decoder 112 and attribute information outputted from the third decoder 113, and merges the foreground image data and the attribute information, thereby restores attribute information before masking by the attribute information mask unit 105.

More particularly, when the attribute information outputted from the third decoder 113 is "0" and the value of a corresponding binary pixel in the foreground image data outputted from the first decoder 112 is "1" indicating a character pixel, the attribute information restoration unit 120 changes the attribute information to "1". The attribute information restoration unit 120 outputs the attribute information restored by this method to the image processor 114. This processing will be further described with reference to FIGS. 9A to 9C.

Figure 9A:
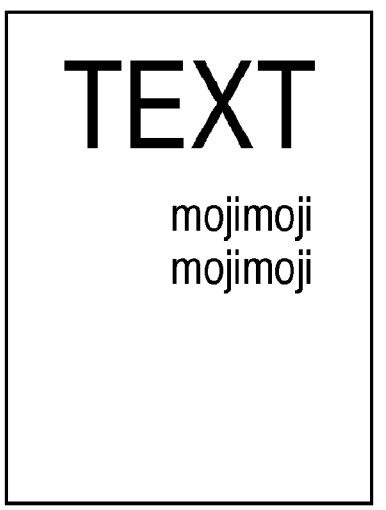
FIGS. 9A to 9C are explanatory diagrams of attribute information restoration processing in the fourth embodiment.
Figure 9B:
Figure 9C:
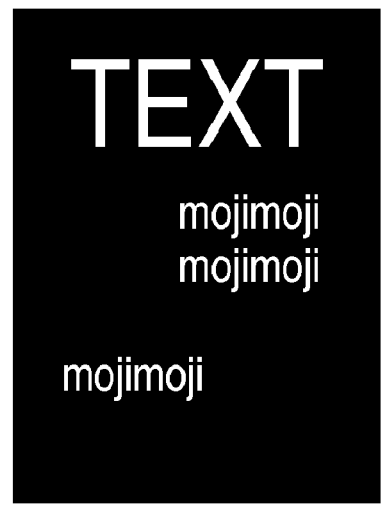

FIG. 9A shows a foreground image obtained by the first decoder 112, and FIG. 9B, attribute information obtained by the third decoder 113. The attribute information restoration unit 120 restores an image in FIG. 9C from these two images. That is, attribute information before masking processing can be restored.

The image processor 114 changes image formation processing in accordance with restored attribute information outputted from the attribute information restoration unit 120, for combined image data outputted from the combining unit 115. For example, when the attribute information indicates a character portion, the image processor 114 sets the number of screen lines to 600 lines, while for the other portions than the image portion, sets the number of screen lines to 300 lines. Then, the image processor 121 performs processing set by a user on image data from the image data output unit 116 in accordance with the restored attribute information, and outputs the result of processing.

As described above, according to the fourth embodiment, on the side of the output image processor 110 (image decoding apparatus), a foreground image and masked attribute information are merged, thereby attribute information before masking can be restored. Accordingly, appropriate image processing by pixel can be performed on the entire image where the foreground image and the background image are combined. That is, as shown in FIG. 8, even when attribute information is required for an image after image data output, attribute information for entire 1 screen can be utilized.

Note that it is apparent that the processing according to the fourth embodiment can be realized with a computer program.

Further, generally, a computer program is stored on a computer-readable storage medium such as a CD-ROM. The storage medium is set in a reading device (CD-ROM drive) of a computer and duplicated or installed in a system, thereby the program becomes executable. Accordingly, it is apparent that the computer-readable storage medium is also included in the scope of the present invention.

Further, in the first to fourth embodiments, the present invention is applied to a multi-function apparatus for the sake of convenience of description of the encoding processing and the decoding processing. The present invention is also applicable to a single image encoding apparatus or image decoding apparatus. In such case, it is desirable that encoded data generated by the three encoders are combined as one file.

Further, in the embodiments, attribute data is 1-pixel 1-bit data, however, the attribute data may be 2-bit or more bit data (multi-bit data) to indicate plural attribute items. In a foreground image area, only one type of bit exists as a character/line drawing or non-character/line drawing determination bit, accordingly, the attribute data acts such that the amount of encoded data is reduced.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application Nos. 2008-037947 filed on Feb. 19, 2008, and 2008-296041 filed on Nov. 19, 2008, which are hereby incorporated by reference herein in their entirety.

What is claimed is:

1. An image encoding apparatus for encoding image data, comprising:
    an input unit which inputs multi-valued image data to be encoded and attribute data of respective pixels constituting the multi-valued image data;
    a determination unit which determines an area including a character/line drawing in the multi-valued image data, as a foreground image area, based on the input multi-valued image data;
    a foreground image generation unit which generates foreground image data in binary representation, having character/line drawing pixels constituting the character/line drawing and non-character/line drawing pixels other than the character/line drawing pixels, from the multi-valued image data in the foreground image area determined by said determination unit;
    a first encoding unit which lossless-encodes the foreground image data generated by said foreground image generation unit;
    a background image generation unit which generates multi-valued background image data by replacing a value of a multi-valued pixel, in a position of said character/line drawing pixel in said multi-valued image data inputted by said input unit, with a replacement value calculated by referring to a value of a multi-valued pixel in a position of said non-character/line drawing pixel, based on the foreground image data generated by said foreground image generation unit;
    a second encoding unit which lossy-encodes the background image data generated by said background image generation unit by performing frequency transformation and quantization;
    a mask unit which masks attribute data for a pixel within said foreground image area obtained by said determination unit with a predetermined value, while maintaining attribute data for a pixel without said foreground image area; and
    a third encoding unit which lossless-encodes attribute data after masking processing by said mask unit.

2. The image encoding apparatus according to claim 1, further comprising a conversion unit which converts a non-character/line drawing pixel adjacent to a character/line drawing pixel within said foreground image area generated by said foreground image generation unit to a value indicating a character/line drawing pixel,
    wherein said background image generation unit generates said background image data using foreground image data after conversion by said conversion unit.

3. The image encoding apparatus according to claim 1, wherein said foreground image generation unit includes an extraction unit which, upon generation of said foreground image data, detects a character color from a pixel value of said multi-valued image data corresponding to a pixel position inside an edge of the character/line drawing, and extracts an average of detected colors as color information of the character/line drawing,
    and wherein said first encoding unit outputs, color information extracted by said extraction unit in addition to encoded data of said foreground image data.

4. An image processing apparatus for generating image data by decoding encoded data outputted from the image encoding apparatus in claim 3, and outputting said image data, comprising:
    a first decoding unit which decodes encoded data of foreground image data;
    a second decoding unit which decodes encoded data of background image data;
    a third decoding unit which decodes encoded data of attribute information;
    an image processing unit which performs image processing for character/line drawing or image processing for non-character/line drawing on each pixel data in background image data obtained by decoding by said second decoding unit, in accordance with attribute information obtained by decoding by said third decoding unit; and
    an output unit which, based on foreground image area information indicated with foreground image data generated by said first decoding unit, binary data for identification of a character/line drawing or a non-character/line drawing in a foreground image area indicated with said foreground image area information and color information of said character/line drawing, when a pixel of interest in image data obtained by said image processing unit is a non-character/line drawing pixel, outputs a pixel value of said pixel of interest, while when said pixel of interest is a character/line drawing pixel, outputs the color information of the character/line drawing in the foreground image area including said pixel of interest in place of the pixel value of said pixel of interest.

5. The image processing apparatus according to claim 4, wherein said third decoding unit includes a change unit which, based on the foreground image area information indicated with said foreground image data obtained by decoding by said first decoding unit and said binary data, when attribute information of a pixel of interest obtained by decoding indicates a non-character/line drawing and a pixel of interest by said binary data indicates a character/line drawing, changes the attribute information of said pixel of interest to attribute information indicating a character/line drawing.

6. An image processing apparatus for generating image data by decoding encoded data outputted from the image encoding apparatus in claim 3, and outputting said image data, comprising:
    a first decoding unit which decodes encoded data of foreground image data;
    a second decoding unit which decodes encoded data of background image data;
    a third decoding unit which decodes encoded data of attribute information;

an image processing unit which performs image processing for character/line drawing or image processing for non-character/line drawing on each pixel data in background image data obtained by decoding by said second decoding unit, in accordance with attribute information obtained by decoding by said third decoding unit; and a combining unit which, based on foreground image area information indicated with foreground image data generated by said first decoding unit, binary data for identification of a character/line drawing or a non-character/line drawing in a foreground image area indicated with said foreground image area information and color information of said character/line drawing, when a pixel of interest in image data obtained by said image processing unit is a non-character/line drawing pixel, outputs a pixel value of said pixel of interest, while when said pixel of interest is a character/line drawing pixel, outputs the color information of the character/line drawing in the foreground image area including said pixel of interest in place of the pixel value of said pixel of interest.

7. An image processing apparatus for generating image data by decoding encoded data outputted from the image encoding apparatus in claim 3, and outputting said image data, comprising:

a first decoding unit which decodes encoded data of foreground image data;

a second decoding unit which decodes encoded data of background image data;

a third decoding unit which decodes encoded data of attribute information;

a combining unit which, based on foreground image area information indicated with foreground image data generated by said first decoding unit, binary data for identification of a character/line drawing or a non-character/line drawing in a foreground image area indicated with said foreground image area information and color information of said character/line drawing, when a pixel of interest in background image data obtained by said second decoding unit is a non-character/line drawing pixel, outputs a pixel value of said pixel of interest, while when said pixel of interest is a character/line drawing pixel, replaces the pixel value of said pixel of interest with the color information of the character/line drawing in the foreground image area including said pixel of interest and outputs the information;

a change unit which, based on foreground image area information indicated with the foreground image data generated by said first decoding unit, binary data for identification of a character/line drawing or a non-character/line drawing in the foreground image area indicated with said foreground image area information and color information of said character/line drawing, when said binary data for a pixel of interest indicates a character/line drawing pixel, outputs attribute information indicating that said pixel of interest is a character/line drawing pixel, while when the binary data for said pixel of interest indicates a non-character/line drawing pixel, outputs attribute information of a pixel of interest obtained by third decoding unit; and an image processing unit which performs image processing for character/line drawing or image processing for non-character/line drawing on each pixel data in image data obtained by said combining unit in accordance with attribute information obtained by said change unit, and outputs processed image data.

8. A control method for an image encoding apparatus for encoding image data, comprising:

an input step of inputting multi-valued image data to be encoded and attribute data of respective pixels constituting the multi-valued image data;

a determination step of determining an area including a character/line drawing in the multi-valued image data, as a foreground image area, based on the input multi-valued image data;

a foreground image generation step of generating foreground image data in binary representation, having character/line drawing pixels constituting the character/line drawing and non-character/line drawing pixels other than the character/line drawing pixels, from the multi-valued image data in the foreground image area determined at said determination step;

a first encoding step of lossless-encoding the foreground image data generated at said foreground image generation step;

a background image generation step of generating multi-valued background image data by replacing a value of a multi-valued pixel, in a position of said character/line drawing pixel in said multi-valued image data inputted at said input step, with a replacement value calculated by referring to a value of a multi-valued pixel in a position of said non-character/line drawing pixel, based on the foreground image data generated at said foreground image generation step;

a second encoding step of lossy-encoding the background image data generated at said background image generation step by performing frequency transformation and quantization;

a mask step of masking attribute data for a pixel within said foreground image area obtained at said determination step with a predetermined value, while maintaining attribute data for a pixel without said foreground image area; and a third encoding step of lossless-encoding attribute data after masking processing at said mask step.

9. The control method for image encoding apparatus according to claim 8, further comprising a conversion step of converting a non-character/line drawing pixel adjacent to a character/line drawing pixel within said foreground image area generated at said foreground image generation step to a value indicating a character/line drawing pixel, wherein at said background image generation step, said background image data is generated using foreground image data after conversion at said conversion step.

10. The control method for image encoding apparatus according to claim 8, wherein said foreground image generation step includes an extraction step of, upon generation of said foreground image data, detecting a character color from a pixel value of said multi-valued image data corresponding to a pixel position inside an edge of the character/line drawing, and extracting an average of detected colors as color information of the character/line drawing, and wherein at said first encoding step, color information extracted at said extraction step in addition to encoded data of said foreground image data is outputted.

11. A computer program stored on a non-transitory computer-readable storage medium, read and executed by a computer, which causes said computer to function as the image encoding apparatus in claim 1.

12. A non-transitory computer-readable storage medium holding the computer program in claim 11.

13. A control method for an image processing apparatus for generating image data by decoding encoded data outputted from the image encoding apparatus in claim 3, and outputting said image data, comprising:

a first decoding step of decoding encoded data of foreground image data;

a second decoding step of decoding encoded data of background image data;

a third decoding step of decoding encoded data of attribute information;

an image processing step of performing image processing for character/line drawing or image processing for non-character/line drawing on each pixel data in background image data obtained by decoding at said second decoding step, in accordance with attribute information obtained by decoding at said third decoding step; and an output step of, based on foreground image area information indicated with foreground image data generated at said first decoding step, binary data for identification of a character/line drawing or a non-character/line drawing in a foreground image area indicated with said foreground image area information and color information of said character/line drawing, when a pixel of interest in image data obtained at said image processing step is a non-character/line drawing pixel, outputting a pixel value of said pixel of interest, while when said pixel of interest is a character/line drawing pixel, outputting the color information of the character/line drawing in the foreground image area including said pixel of interest in place of the pixel value of said pixel of interest.

14. The control method for image processing apparatus according to claim 13, wherein said third decoding step includes a change step of, based on the foreground image area information indicated with said foreground image data obtained by decoding at said first decoding step and said binary data, when attribute information of a pixel of interest obtained by decoding indicates a non-character/line drawing and a pixel of interest by said binary data indicates a character/line drawing, changing the attribute information of said pixel of interest to attribute information indicating a character/line drawing.

15. A control method for an image processing apparatus for generating image data by decoding encoded data outputted from the image encoding apparatus in claim 3, and outputting said image data, comprising:

a first decoding step of decoding encoded data of foreground image data;

a second decoding step of decoding encoded data of background image data;

a third decoding step of decoding encoded data of attribute information;

an image processing step of performing image processing for character/line drawing or image processing for non-character/line drawing on each pixel data in background image data obtained by decoding at said second decoding step, in accordance with attribute information obtained by decoding at said third decoding step; and a combining step of, based on foreground image area information indicated with foreground image data generated at said first decoding step, binary data for identification of a character/line drawing or a non-character/line drawing in a foreground image area indicated with said foreground image area information and color information of said character/line drawing, when a pixel of interest in image data obtained at said image processing step is a non-character/line drawing pixel, outputting a pixel value of said pixel of interest, while when said pixel of interest is a character/line drawing pixel, outputting the color information of the character/line drawing in the foreground image area including said pixel of interest in place of the pixel value of said pixel of interest.

16. A computer program stored on a non-transitory computer-readable storage medium, read and executed by a computer, which causes said computer to function as the image encoding apparatus in claim 4.

17. A non-transitory computer-readable storage medium holding the computer program in claim 16.

* * * * *